Jan. 8, 1929.
C. B. ULRICH
1,698,518
VERTICAL FILE
Filed Sept. 23, 1926
3 Sheets-Sheet 1
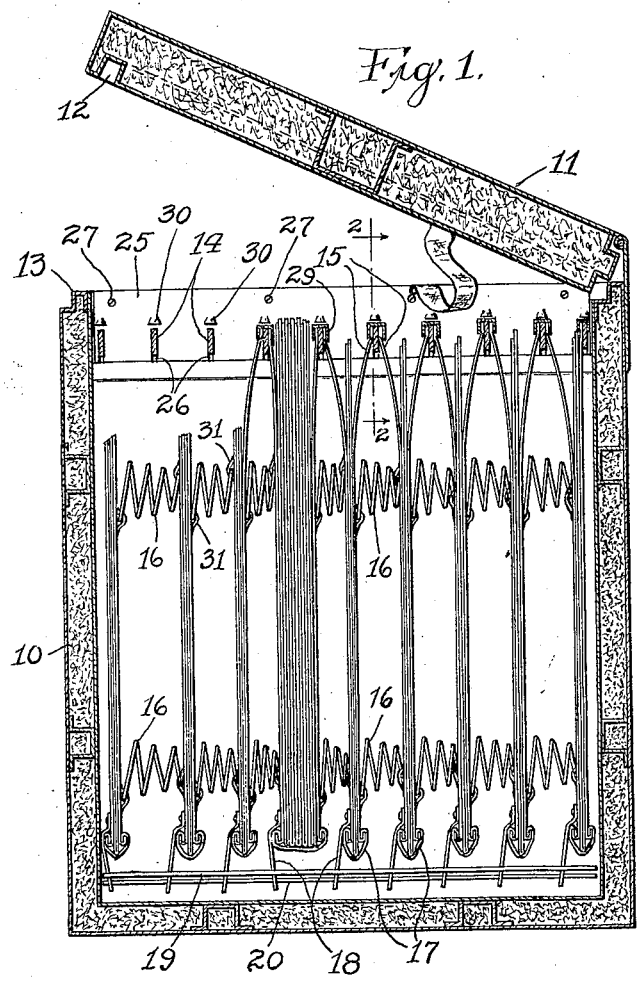
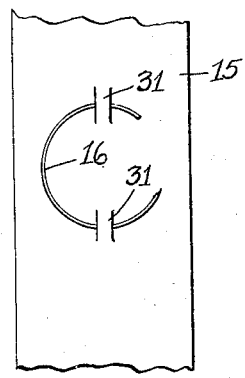
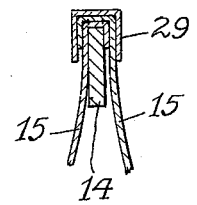
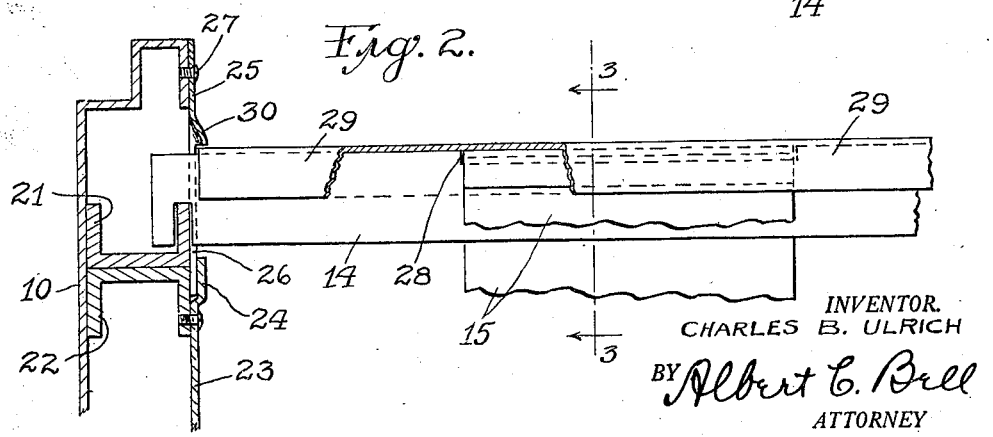
INVENTOR.
CHARLES B. ULRICH
BY Albert C. Bell
ATTORNEY

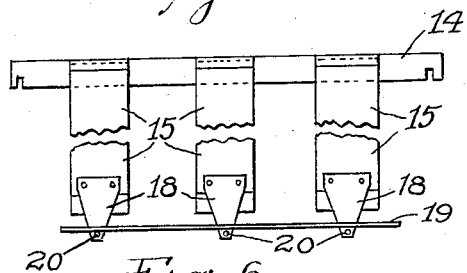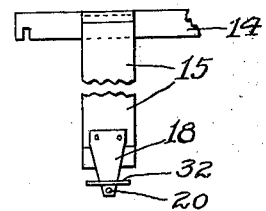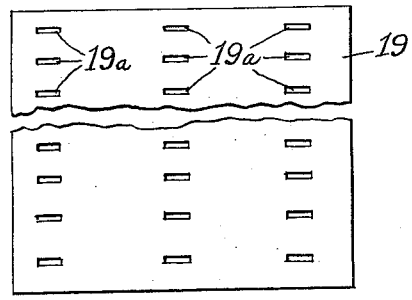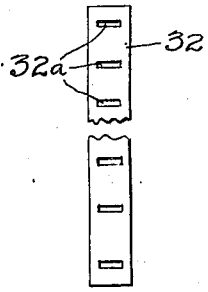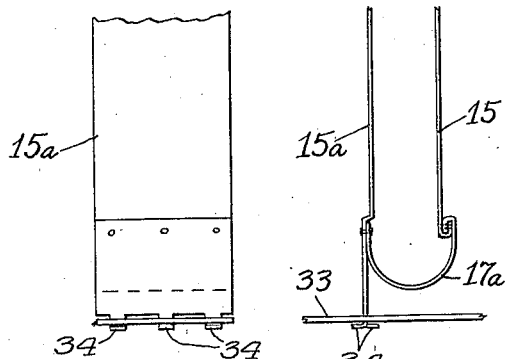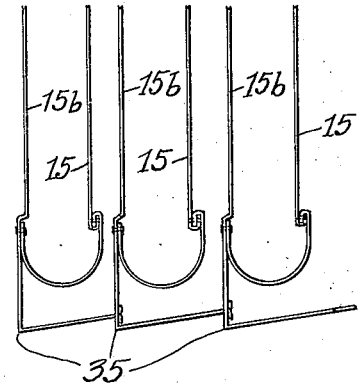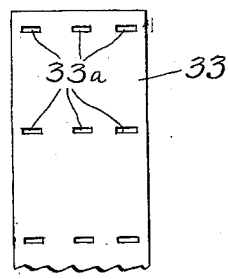

Jan. 8, 1929.  
C. B. ULRICH  
1,698,518

VERTICAL FILE

Filed Sept. 23, 1926   3 Sheets-Sheet 3.

INVENTOR.
CHARLES B. ULRICH
BY Albert C. Bell
ATTORNEY

Patented Jan. 8, 1929.

1,698,518

UNITED STATES PATENT OFFICE.

CHARLES B. ULRICH, OF JAMESTOWN, NEW YORK.

VERTICAL FILE.

Application filed September 23, 1926. Serial No. 137,242.

My invention relates to an improved construction of vertical file adapted particularly for the filing of drawings and tracings in vertical arrangement, so that each drawing and tracing will be held in flat condition in vertical position, regardless of the number of drawings and tracings contained in the file. This I accomplish by providing filing pockets suspended on spaced rods with compression means between the pockets. The particular features of the present invention are the construction of filing mechanism of the kind described so that the lower ends of the filing pockets are maintained in proper position at all times, to prevent curling and bunching of the drawings or tracings, which I find has occurred to a greater or less extent heretofore, even where compression means are provided between the pockets. To accomplish this improved result, I provide means for maintaining the pockets in spaced relation, so that each pocket has a definite amount of space for the accommodation of filed drawings, papers and tracings. This result I secure in a variety of ways, as described below.

The present invention just described is an improvement on the invention disclosed in United States Letters Patent No. 1,126,923 which issued to me on the second day of February, 1915.

A further object of my invention consists in constructing the cabinet used to contain the suspended pockets, so that the entire pocket arrangement may be conveniently assembled outside of the cabinet and then placed in the cabinet in position to support the bars, which in turn support the pockets, convenient means being provided to hold the supporting bars in spaced relation and lock them in the cabinet against displacement.

Figure 13:
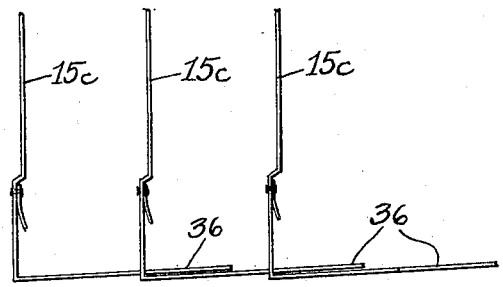
Figure 14:
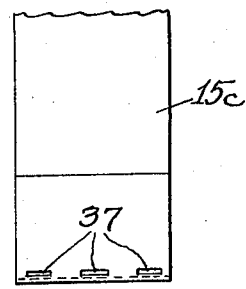
Figure 15:
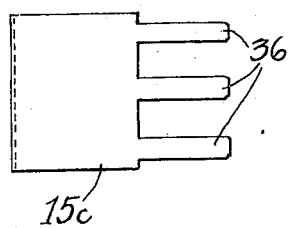
Figure 16:
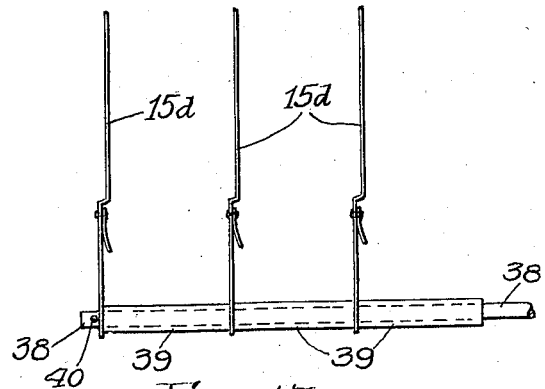
Figure 17:
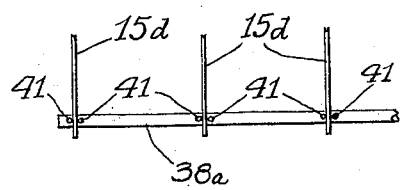
Figure 18:
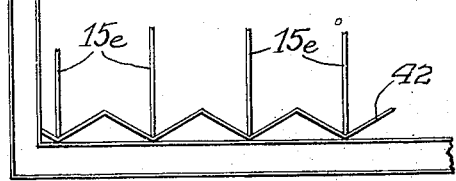

My invention will best be understood by reference to the accompanying drawings, showing a preferred embodiment thereof, in which Fig. 1 is a vertical sectional view through a filing cabinet, with my improved filing device in place therein, Fig. 2 is a sectional view to an enlarged scale, of the parts shown in Fig. 1, taken along the line 2—2, Fig. 3 is a sectional view of the parts shown in Fig. 2 taken along the line 3—3, Fig. 4 is a detail view to an enlarged scale of the means employed for securing the compression springs to the pocket members, Fig. 5 is a side elevation to a reduced scale showing one of the pocket-supporting bars and the pocket members supported thereby, Fig. 6 is a plan view of the spacing plate used with the pocket construction shown in Fig. 5, Fig. 7 shows in a view similar to Fig. 5, a modified arrangement of spacing means comprising a bar individual to each row of pocket members instead of a single spacing plate, as shown in Figs. 5 and 6, Fig. 8 shows in a view similar to Fig. 6, the spacing bar used in Fig. 7, Fig. 9 shows in a view similar to Figs. 5 and 7, the lower end of one of the pocket members and a modified means for connecting it with the spacing bar employed, Fig. 10 is an edge elevation of the pocket construction shown in Fig. 9, showing the manner of securing the pocket member to the spacing bar, Fig. 11 shows in a view similar to Figs. 6 and 8, the type of spacing bar employed in the construction shown in Figs. 9 and 10, Fig. 12 shows in a view similar to Fig. 10, a modified construction for spacing the pocket members from each other without the use of a spacing bar or plate, Fig. 13 shows in a view similar to Fig. 12, a further modified construction of means for spacing the pocket members from each other without the use of a spacing bar or plate, Fig. 14 shows in a view similar to Fig. 9, the construction of one of the pocket members employed with the construction shown in Fig. 13, Fig. 15 is a bottom view of one of the pocket members used in the construction shown in Fig. 13, Fig. 16 shows in a view similar to Figs. 10 and 12, a modified spacing means between the pocket members, consisting of a rod and spacing sleeves, Fig. 17 shows in a view similar to Fig. 16, a further modified form of spacing means consisting of a rod and pins engaging the lower ends of the pocket members, and Fig. 18 is a fragmental view similar to Fig. 1 showing a part of the casing and a spacing member carried by the bottom wall thereof for engaging the lower ends of the pocket members to maintain them in spaced relation.

Similar numerals refer to similar parts throughout the several views.

As shown in Fig. 1, I illustrate at 10 a casing or cabinet for containing my improved filing device, this casing consisting of spaced sheet-metal walls filled with fire-resisting material, for example asbestos, said casing having a hinged cover 11 similarly constructed and provided with a groove 12 for engaging an upwardly extending flange 13 formed around the upper edge of the cabinet or casing, so that the casing may be tightly closed against water and fire when the cover is closed.

The casing 10 supports in horizontal position near its upper end, a plurality of supporting bars 14 from which pocket member 15 hang. Compression springs 16 are placed between the members 15 supported by each bar 14 to tend to separate these members, these springs being secured to the members in a manner to be described. Each member 15 supported by one of the bars 14, is connected at its lower edge with an adjacent pocket member 15 supported by the next bar 14, by means of a fabric pocket 17 to support the filed papers, folders, drawings, etc., in vertical position and the parts are so proportioned that whatever may be the amount of filed material in any pocket, it will be free from and not engage the parts of the structure beneath it.

One of the pocket members 15 supported by each of the bars 14 is, with the construction shown in Fig. 1, provided with a downwardly extending plate 18, which is secured thereto and bent to clear the corresponding pocket 17, the lower end of the extending plate extending through a spacing plate 19 below which the plate 18 is apertured to receive a retaining rod 20, all of these parts being preferably disposed so as to clear the inner bottom surface of the casing 10.

As shown in Figs. 2 and 3, the sides of the casing 10 are provided near their upper edges with supporting channel bars 21, having upwardly extending flanges to be engaged by end notches formed in the bars 14. Similar channel bars 22 with downwardly extending flanges are provided below the channel bars 21 to support the walls of the casing 10. Each inner side wall 23 of the casing stops just below the lower edges of the bars 14 and is offset at its upper edge, as indicated at 24, to form a space for receiving the retaining plate 25, which is provided with slots 26 engaging the bars 14 to hold them in vertical position and prevent their being lifted to clear the channel bars 21. After being inserted in the manner described, with its lower edge between the offset portion 24 and the channel bars 21 and 22, the plate 25 is held in place by screws 27, extending into the formed upper portion of the outer sheets of the side walls of the casing.

As shown in Figs. 2 and 3, each of the supporting bars 14 is notched at its upper edge as shown at 28, to receive the bent upper ends of the corresponding pocket members 15, which are bent over each other in each of said notches, as indicated in Fig. 3 and are held in place in said notches by a retaining channel bar 29 which is so formed as to tightly engage the bent upper ends of the pocket members 15 when it is forced in place over them. The retaining channel bars 29 are of a length to just clear the inner surfaces of the plates 25, and these plates have projecting lugs 30 formed from them, extending slightly into the interior of the casing so that when each of the retaining bars 29 is forced into place, it is forced at each end past one of the lugs 30 and interlocks under said lug in the manner indicated in Fig. 2, the lugs thus preventing the retaining bars from being lifted vertically from the corresponding supporting bars 14.

As shown in Fig. 4, each of the compression springs is preferably secured to the corresponding pocket members 15, by forming from the pocket member, bent tongues 31 between which and the body portion of the pocket member 15, the end turn of the spring 16 is threaded. In this way, the springs are positively maintained in proper position at all times.

In Figs. 5 and 6, one of the means employed at the lower ends of the pockets to properly space them, is illustrated. As shown in Fig. 5, the plates 18 are secured to the corresponding pocket members 15, for example, by riveting and are tapered toward their lower ends to extend through suitable apertures in a spacing plate 19, retaining rods 20 extending through the lower ends of the plates 18, below the spacing plate 19. In Fig. 6, the relation of the apertures 19$^a$ in the plate 19, is shown to hold the pocket members in proper relative position at all times.

If desired, the common retaining plate 19, shown in Figs. 1, 5 and 6, may be replaced by several retaining bars, one for each row of pocket members, laterally of the pocket construction as shown in Figs. 7 and 8. In this modified construction the retaining bar is indicated at 32 to engage the extension plates 18 on one row of pocket members 15 and held in place as before, by a retaining rod 20, the construction being the same in other respects as that already described. In Fig. 8 the apertures 32$^a$ are illustrated in the bar 32 to receive the lower ends of the extension plates 18, as described. This construction has the advantage over the construction shown in Figs. 5 and 6, of permitting the several rows of pocket members to operate independently of each other, which is desirable in some cases, for example where the contents of the pockets are thicker at some portions than others.

As shown in Figs. 9, 10 and 11, one member 15$^a$ of each pair of pocket members, supported by adjacent bars 14, is of modified construction, consisting in offsetting it slightly at the upper edge of the corresponding pocket 17$^a$ to receive the upper edge of the pocket, from which the pocket member 15ª is itself continued to and through the spacing bar 33. The portion of the member 15ª extending through the spacing bar, is preferably in the form of tongues 34, which are reversely bent as indicated, to retain the pocket members 15ª in engagement with the retaining bar. In Fig. 11 the apertures 33ª through the bar 33, to receive the tongues 34, are illustrated.

In Fig. 12, I illustrate in a view similar to Fig. 10, a modified spacing construction for the lower ends of the pockets, and in this construction the alternate pocket members 15ᵇ are formed similarly to the pocket members 15ª, the only difference being that they are longer at their lower ends and are bent at 35 so that each extends into engagement with the next one of the pocket members 15ᵇ, as illustrated. The extreme end of each of the bent ends, of the pocket members 15ᵇ is preferably constructed with tongues in the manner described for the construction shown in Figs. 9 and 10, to engage suitable apertures in the next adjacent pocket member 15ᵇ with which it connects, so that the pocket members 15ᵇ are locked together with substantially the same effect as though the construction shown in Figs. 9 to 11 were employed.

The construction shown in Figs. 13, 14 and 15, is similar to that shown in Fig. 12, the only difference being that the pocket members 15ᶜ are provided at their extreme ends with elongated tongues 36 extending through apertures 37 in the adjacent pocket members 15ᶜ so that while the effect of the bent lower ends of the pocket members 15ᶜ is to space these pocket members from each other, due to the shoulder portions of the lower ends of the pocket members between the tongues 36, there is some opportunity for changing of the spacing as conditions may require, there being no positive connection between the several pocket members 15ᶜ at their lower ends, and the operation of assembling the pocket members for insertion into the casing is somewhat simplified. In Fig. 13 the alternate pocket members 15 are omitted for sake of clearness.

In Fig. 16 I illustrate a modified construction of spacing means for the lower ends of pocket members 15ᵈ, similar to the pocket members 15ª excepting that no tongues are formed on the lower ends of these pocket members and that they are provided instead with holes or apertures for receiving a rod 38, which rod in turn supports spacing tubes 39 between the lower ends of the pocket members 15ᵈ. The end one of the pocket members 15ᵈ is held in place on the rod 38 by a pin 40. In this view the alternate pocket members 15 are omitted for the sake of clearness.

In Fig. 17 I illustrate a construction similar to that shown in Fig. 16, the only difference being that the spacing tubes 39 are omitted and instead the rod 38ª itself constitutes the spacing means by inserting pins 41 through it adjacent the lower ends of the pocket members 15ᵈ.

In Fig. 18 I illustrate a form of spacing means for the lower ends of the alternate pocket members, which may be carried by the casing itself. In this construction a part of the casing is shown at 10, and on the inner bottom surface of the casing a bent bar or plate 42 is placed, this bar being corrugated and preferably sharp angled at the corrugations so that the lower ends of the alternate pocket members 15ᵉ may engage the angles of the corrugations and be retained relatively to each other in desired spacing by said corrugations; it being understood that the construction of these pocket members is preferably as shown in Figs. 9 and 10, for the pocket members 15ª excepting that the lower ends of the members are extended and are not provided with tongues. The corrugated member 42 may either rest loosely on the bottom of the cabinet or may be secured thereto, as desired and may be employed with the integral form of pocket members shown in Fig. 9 or with the construction illustrated in Fig. 1 in which the alternate pocket members have extending spacing plates 18 secured to them.

As a result of the construction described, it will appear that I provide means by which the pocket members may be held in one way or another, in spaced relation at their lower ends, to at the same time restrict the filing space between alternate pocket members at their lower ends and yet afford the maximum filing capacity for which each pocket is intended. It will also be observed that my improved construction greatly facilitates the assembly of the filing pockets in complete relation before mounting the same in the casing or cabinet, so that the insertion of the pockets into the cabinet is greatly facilitated and that when completely assembled in the cabinet, projecting edges and corners that might interfere with the use of the device, are eliminated.

It will be understood that while I show springs of the type illustrated as the means for securing compression on the several pockets, any equivalent means may be employed for producing the same results, regardless of the nature of the springs or their shape, or whether the resilient action is the result of the action of the springs or the pocket members or both. It will further be understood that the pocket members described may be of any suitable material, although in practice I find it convenient to construct them of thin sheet-metal; the lower extensions from alternate ones of the pocket members should preferably be sufficiently stiff to maintain the corresponding lower portions of the side walls of the pockets substantially in the same vertical planes as the upper portions of the respective side walls, as a result of which where the pocket members are relatively thin, it is preferable to employ separate plates to constitute the lower pocket member extensions, but on the other hand where alternate ones of the pocket members may be relatively thick and comparatively rigid, they may be effectively extended as described so that the pocket members in this case will have integral downward extensions. It will further be understood that the compression means employed may be mounted on or incorporated in the pocket members in any desired manner and that the flexible pocket bottoms may be of any suitable material whether fabric or otherwise and that they may be secured to the pocket members in any convenient manner.

While I have shown my invention in the particular embodiment above described, it will be understood that I do not limit myself to this exact construction as I may employ equivalents known to the art at the time of the filing of this application without departing from the scope of the appended claims.

What I claim is:

1. In a vertical file, the combination of a casing having bottom and side walls, pockets having flexible bottoms and comprising members suspended in the casing from its upper portion, compression means between said pockets tending to press the pocket members together to collapse the pockets, and devices between the lower portions of said pocket members effecting a spacing of the lower portions of said pockets and permitting free distension and collapse of said flexible bottoms.

2. In a vertical file, the combination of a casing having bottom and side walls, pockets having flexible bottoms and comprising members suspended in the casing from its upper portion, compression means between said pockets tending to press the pocket members together to collapse the pockets, and devices between the lower portions of said pocket members effecting a spacing of the lower portions of said pockets and permitting free distension and collapse of said flexible bottoms, said spacing devices comprising downward extensions from alternate ones of said pocket members, and spacing connections between said extensions.

3. In a vertical file, the combination of a casing having bottom and side walls, pockets having flexible bottoms and comprising members suspended in the casing from its upper portion, compression means between said pockets tending to press the pocket members together to collapse the pockets, and devices between the lower portions of said pocket members effecting a spacing of the lower portions of said pockets and permitting free distention and collapse of said flexible bottoms, said spacing devices comprising downward extensions from alternate ones of said pocket members, a transverse plate having spaced apertures receiving the lower ends of said extensions, and a rod extending through the lower ends of said extensions below said transverse plate.

4. In a vertical file, the combination of a casing having bottom and side walls, pockets having flexible bottoms and comprising members suspended in the casing from its upper portion, compression means between said pockets tending to press the pocket members together to collapse the pockets, and devices between the lower portions of said pocket members effecting a spacing of the lower portions of said pockets and permitting free distension and collapse of said flexible bottoms, said spacing devices comprising downward extensions from alternate ones of said pocket members, and a plate engaging the lower ends of said extensions and holding them in spaced relation.

5. In a vertical file, the combination of a casing having bottom and side walls, pockets having flexible bottoms and comprising members suspended in the casing from its upper portion, compression means between said pockets tending to press the pocket members together to collapse the pockets, and devices between the lower portions of said pocket members effecting a spacing of the lower portions of said pockets and permitting free distension and collapse of said flexible bottoms, said spacing devices comprising plates secured to and extending downwardly from alternate ones of said pocket members, and spacing connections between said plates.

6. In a vertical file, the combination of a casing having bottom and side walls, pockets having flexible bottoms and comprising members suspended in the casing from its upper portion, compression means between said pockets tending to press the pocket members together to collapse the pockets, and devices between the lower portions of said pocket members effecting a spacing of the lower portions of said pockets and permitting free distension and collapse of said flexible bottoms, said spacing devices comprising plates secured to and extending downwardly from alternate ones of said pocket members, a transverse plate having spaced apertures receiving the lower ends of said extending plates, and a rod extending through the lower ends of said extending plates below said transverse plate.

7. In a vertical file, the combination of a casing having bottom and side walls, pockets having flexible bottoms and comprising members suspended in the casing from its upper portion, compression means between said pockets tending to press the pocket members together to collapse the pockets, and devices between the lower portions of said pocket members effecting a spacing of the lower portions of said pockets and permitting free distension and collapse of said flexible bottoms, said spacing devices comprising downward extensions from alternate ones of said pocket members, and spacing connections between said extensions, there being a plurality of pairs of said pocket members for each of said pockets arranged in rows transversely of said pockets, and said spacing connections being individual to each of said rows of pocket members.

8. In a vertical file, the combination of a casing having bottom and side walls, pockets having flexible bottoms and comprising members suspended in the casing from its upper portion, compression means between said pockets tending to press the pocket members together to collapse the pockets, and devices between the lower portions of said pocket members effecting a spacing of the lower portions of said pockets and permitting free distension and collapse of said flexible bottoms, said spacing devices comprising downward extensions from alternate ones of said pocket members, a transverse plate having spaced apertures receiving the lower ends of said extensions, and a rod extending through the lower ends of said extensions below said transverse plate, said pocket members comprising a plurality of pairs for each of said pockets arranged in rows transversely of said pockets, there being one of said transverse plates for each of said rows of pocket members.

9. In a vertical file, the combination of a casing having bottom and side walls, pockets having flexible bottoms and comprising members suspended in the casing from its upper portion, compression means between said pockets tending to press the pocket members together to collapse the pockets, and devices between the lower portions of said pocket members effecting a spacing of the lower portions of said pockets and permitting free distension and collapse of said flexible bottoms, said spacing devices comprising plates secured to and extending downwardly from alternate ones of said pocket members, and spacing connections between said plates, there being a plurality of pairs of said pocket members for each of said pockets arranged in rows transversely of said pockets, and said spacing connections being individual to each of said rows of pocket members.

10. In a vertical file, the combination of a casing having bottom and side walls, pockets having flexible bottoms and comprising members suspended in the casing from its upper portion, compression means between said pockets tending to press the pocket members together to collapse the pockets, and devices between the lower portions of said pocket members effecting a spacing of the lower portions of said pockets and permitting free distension and collapse of said flexible bottoms, said spacing devices comprising plates secured to and extending downwardly from alternate ones of said pocket members, a transverse plate having spaced apertures receiving the lower ends of said extending plates, and a rod extending through the lower ends of said extending plates below said transverse plate, said pocket members comprising a plurality of pairs for each of said pockets arranged in rows transversely of said pockets, there being one of said transverse plates for each of said rows of pocket members.

11. In a vertical file, the combination of a plurality of filing pockets having closed bottoms, members supporting the upper portions of said pockets, compression means between said pockets, and devices between the lower portions of said pockets effecting a spacing thereof and permitting free distension and collapse of said pocket bottoms.

12. In a vertical file, the combination of a plurality of filing pockets having closed bottoms, members supporting the upper portions of said pockets, compression means between said pockets, and devices between the lower portions of said pockets effecting a spacing thereof and permitting free distension and collapse of said pocket bottoms, said spacing devices comprising a downward extension from one side of each of said pockets, and spacing connections between said extensions.

13. In a vertical file, the combination of a plurality of filing pockets having closed bottoms, members supporting the upper portions of said pockets, compression means between said pockets, and devices between the lower portions of said pockets effecting a spacing thereof and permitting free distension and collapse of said pocket bottoms, said spacing devices comprising a downward extension from one side of each of said pockets, and a spacing plate secured to said extensions.

14. In a vertical file, the combination of a plurality of filing pockets having closed bottoms, members supporting the upper portions of said pockets, compression means between said pockets, and devices between the lower portions of said pockets effecting a spacing thereof and permitting free distension and collapse of said pocket bottoms, said spacing devices comprising a downward extension from one side of each of said pockets, and a plate engaging the lower ends of said extensions and holding them in spaced relation.

15. In a vertical file, the combination of a plurality of filing pockets having closed bottoms, members supporting the upper portions of said pockets, compression means between said pockets, and devices between the lower portions of said pockets effecting a spacing thereof and permitting free distension and collapse of said pocket bottoms, said spacing devices comprising a plate secured to and extending downwardly from one side of each of said pockets, and spacing connections between said plates.

16. In a vertical file, the combination of a plurality of filing pockets having closed bottoms, members supporting the upper portions of said pockets, compression means between said pockets, and devices between the lower portions of said pockets effecting a spacing thereof and permitting free distension and collapse of said pocket bottoms, said spacing devices comprising a plate secured to and extending downwardly from one side of each of said pockets, a transverse plate having spaced apertures receiving the lower ends of said extending plates, and a rod extending through the lower ends of said extending plates below said transverse plate.

In witness whereof, I hereunto subscribe my name this 21st day of September, A. D. 1926.

CHARLES B. ULRICH.